2,937,163
WATER-SOLUBLE POLYMERIZATION PRODUCTS AND PROCESSES FOR PRODUCING THE SAME

John L. Lang, Midland, Mich., assignor to The Dow Chemical Company, Midland, Mich., a corporation of Delaware No Drawing. Application March 7, 1955
Serial No. 492,764

6 Claims. (Cl. 260—79.3)

This invention relates to water-soluble resins that are useful as coating or sizing materials and to processes for preparing the same.

Sulfur dioxide and unsaturated compounds, such as olefins, are known to react in the presence of suitable catalysts to produce polysulfones of high molecular weight and resinous character. Generally, such resins exhibit properties that make them useful as molding materials, but they are frequently so insoluble in water or other common solvents as to have little utility in casting and coating operations. Because of the relatively short thermal life of such resins it became desirable to produce new soluble resins of greater stability. Improved water-soluble resins are disclosed in copending applications of R. R. Dreisbach and J. F. Mulloy, Serial Nos. 386,328, filed October 15, 1953, Patent No. 2,794,014 and 393,594, filed November 15, 1953, Patent No. 2,778,812. In those applications certain unsaturated materials, specifically acrylic acid and a vinyl alkyl ether are polymerized with gaseous $SO_2$ to produce water-soluble resins. The use of gaseous $SO_2$ as a monomeric material requires large excesses of $SO_2$ to be employed and consequently requires the use of pressure equipment in introducing the $SO_2$ into the mixture and in the polymerization vessel itself. This adds to the cost of the resin, makes control of the reaction difficult, and hinders the handling of the polymerized resin.

It would be desirable and it is a principal object of this invention to provide an improved process for polymerizing olefinically unsaturated materials with $SO_2$ which avoids the necessity of using pressure equipment.

The above and related objects are accomplished by means of a process in which an alpha, beta-unsaturated carboxylic acid, a monovinyl ether, and a compound capable of liberating $SO_2$ when treated with an acid, are polymerized in certain proportions in acidic aqueous medium in the presence of a polymerization catalyst. The result of the polymerization process is a clear aqueous solution of a polymer which may be used directly or, alternatively, the solution may be evaporated to concentrate or recover the polymer, or the polymer may be precipitated from the solution. In both of the latter cases the polymer may be shipped or stored in the dry state and redissolved in an aqueous medium before use.

The alpha,beta-unsaturated carboxylic acids which are useful in the process of the invention are the acrylic acids, and alpha-alkyl substituted acrylic acids. Typical examples of those acids are acrylic acid and methacrylic acid.

The monovinyl ethers which may be used are those containing a single vinyl group and an alkyl, haloalkyl or methoxyalkyl group wherein alkyl contains from 1 to 4 carbon atoms. Larger alkyl groups may be employed but their vinyl ethers are more expensive to prepare and the water solubility of the resulting polymers is usually lessened. Typical examples of such ethers are vinyl ethyl ether, vinyl 2-chloroethyl ether and vinyl 2-methoxyethyl ether.

In the process of this invention the sulfur dioxide is produced in situ from a compound which liberates $SO_2$ in the presence of acid. Such compounds as are herein contemplated are water-soluble inorganic salts ionizable into sulfite, bisulfite, meta-bisulfite and thiosulfate ions. As typical examples of such compounds may be mentioned sodium sulfite, sodium bisulfite, potassium meta-bisulfite and sodium thiosulfate.

The ratios of the polymerizable compounds which may be employed may be varied within wide limits. Thus, the unsaturated acid may be employed in amounts of from 50 to 79 percent by weight of the total polymerizable compounds, the vinyl alkyl ether in amounts of from 20 to 49 percent, and the sulfur dioxide liberating compounds in amounts to provide from 0.5 to 8 percent sulfur dioxide by weight, of the total polymerizable compounds. When larger amounts of the unsaturated acid are employed, the polymers are more expensive to prepare and more corrosive to fabrication equipment. When larger amounts of vinyl alkyl ethers are employed, the resulting polymers show a markedly decreased water solubility.

The polymers prepared in accordance with this invention are water-soluble and form clear, viscous aqueous solutions. The solutions may be used immediately after polymerization in casting and coating or sizing operations. If it is desired to ship or to store the polymer, however, it is usually more economical to isolate the polymer by precipitation or evaporation. Any conventional method for precipitating polymers or polybasic acids may be employed, such as formation of a water-insoluble salt of the acid or by the addition of a non-solvent for the polymer to the aqueous solution. The principal uses for the present copolymers are as textile sizes and as soil agglomerating agents.

The process of the invention will be more apparent from the following illustrative examples in which all parts are by weight.

Example 1

A mixture of 20 parts vinyl ethyl ether, 30 parts acrylic acid and 2 parts sodium sulfite was stirred into 100 parts water together with 1 part potassium persulfate as a polymerization catalyst. The polymerization charge was heated to 50° C. at atmospheric pressure to initiate polymerization. After 16 hours a clear, viscous, aqueous solution of polymer resulted. Part of the solution was cast directly onto a glass plate and after drying a clear continuous film of sulfur-containing polymer had been deposited. Textile materials were dipped into another portion of the solution, allowed to drain dry, and were finally air-dried. The fibers were found to be covered with a film of the polymer which served as an adherent size which, however, could be removed easily by washing in water.

Substantially identical polymers were prepared from the same monomers employing sodium thiosulfate in place of sodium sulfite. The resulting polymers were water-soluble and could be cast into clear films. The water solutions were effective soil conditioners and slime flocculants.

Example 2

In a manner similar to that of Example 1 polymers were prepared from a monomeric mixture consisting of 25 parts methacrylic acid, 25 parts of vinyl beta-chloroethyl ether, and 2.0 parts of sodium bisulfite. After polymerization was complete the result was a clear, viscous, aqueous solution of the polymer. When the solution was cast onto glass plates and dried, a clear film was deposited. The copolymer is useful as a size for natural and synthetic textile fibers.

Substantially identical compounds are produced when water-soluble meta-bisulfites are used as the source of sulfur dioxide.

I claim:

1. A process for producing water-soluble polymeric materials comprising the addition to water of monomeric materials consisting of from 50 to 79 percent by weight of an acid selected from the group consisting of acrylic and methacrylic acids, from 20 to 49 percent by weight of a monovinyl ether from the group consisting of vinyl alkyl, vinyl monohalo alkyl and vinyl methoxyalkyl ethers wherein alkyl contains from 1 to 4 carbon atoms, and an ionizable inorganic salt selected from the group consisting of sulfites, bisulfites, metabisulfites, and thiosulfates in an amount containing the equivalent of from 0.5 to 8 percent by weight of combined sulfur dioxide based on the weight of monomers, in the presence of from 0.1 to 5 percent by weight of a water-soluble inorganic polymerization catalyst, and subjecting the solution to polymerization conditions.

2. The process claimed in claim 1, wherein the vinyl alkyl ether is vinyl ethyl ether.

3. The process claimed in claim 2, wherein the inorganic compound is sodium sulfite.

4. The process claimed in claime 2, wherein the inorganic compound is sodium bisulfite.

5. The process claimed in claim 2, wherein the inorganic compound is sodium thiosulfate.

6. The process claimed in claim 2, wherein the inorganic compound is potassium meta-bisulfite.

References Cited in the file of this patent

UNITED STATES PATENTS

| | | |
|---|---|---|
| 2,462,354 | Brubaker et al. | Feb. 22, 1949 |
| 2,543,636 | Loritsch | Feb. 27, 1951 |
| 2,572,028 | Hunt | Oct. 23, 1951 |